(12) United States Patent
Krivtsov et al.

(10) Patent No.: US 9,281,647 B2
(45) Date of Patent: Mar. 8, 2016

(54) PASS-THROUGH CONNECTOR

(75) Inventors: Sergey M. Krivtsov, Kitchener (CA);
Otman A. Basir, Waterloo (CA); Nick Makaranka, Kitchener (CA)

(73) Assignee: Intelligent Mechatronic Systems Inc., Waterloo (CA)

(*) Notice: Subject to any disclaimer, the term of this patent is extended or adjusted under 35 U.S.C. 154(b) by 2812 days.

(21) Appl. No.: 11/740,351

(22) Filed: Apr. 26, 2007

(65) Prior Publication Data
US 2008/0268662 A1    Oct. 30, 2008

(51) Int. Cl.
| | |
|---|---|
| *H01R 33/00* | (2006.01) |
| *H01R 27/02* | (2006.01) |
| *G01C 21/26* | (2006.01) |
| *B60R 16/02* | (2006.01) |
| G07C 5/00 | (2006.01) |
| G01C 21/32 | (2006.01) |

(52) U.S. Cl.
CPC ............. *H01R 27/02* (2013.01); *B60R 16/02* (2013.01); *G01C 21/26* (2013.01); *G01C 21/32* (2013.01); *G07C 5/008* (2013.01)

(58) Field of Classification Search
CPC ........ H01R 27/02; B60R 16/02; G01C 21/26; G01C 21/32; G07C 5/008
USPC .............. 701/29, 32, 34, 35, 36, 213; 439/34, 439/638, 336, 655
See application file for complete search history.

(56) References Cited

U.S. PATENT DOCUMENTS

| | | | | |
|---|---|---|---|---|
| 5,289,378 | A * | 2/1994 | Miller ................... | B60R 11/02 235/385 |
| 5,532,927 | A * | 7/1996 | Pink ..................... | G01R 31/007 701/29.7 |
| 5,680,328 | A * | 10/1997 | Skorupski et al. ............... | 701/35 |
| 5,732,074 | A * | 3/1998 | Spaur ..................... | G07C 5/008 370/313 |
| 5,928,292 | A * | 7/1999 | Miller .................. | B60R 11/02 455/575.9 |
| 6,104,988 | A * | 8/2000 | Klarer ................. | G01M 17/007 701/31.4 |
| 6,246,935 | B1 * | 6/2001 | Buckley ................. | B60K 35/00 340/425.5 |
| 6,346,876 | B1 * | 2/2002 | Flick ........................ | 340/426.13 |
| 6,356,823 | B1 * | 3/2002 | Iannotti ............. | H04L 12/40032 369/21 |
| 6,795,760 | B2 * | 9/2004 | Fuller ................ | G07C 9/00309 307/10.1 |
| 6,847,887 | B1 * | 1/2005 | Casino ................... | G01C 21/32 340/995.18 |
| 6,853,956 | B2 * | 2/2005 | Ballard, Jr. ........... | B60K 28/063 180/272 |
| 7,209,850 | B2 * | 4/2007 | Brott .................... | G01R 31/006 324/398 |
| 7,225,065 | B1 * | 5/2007 | Hunt ................... | B60R 16/0207 701/33.2 |
| 7,228,211 | B1 * | 6/2007 | Lowrey ................. | G07C 5/008 701/31.5 |
| 7,346,370 | B2 * | 3/2008 | Spaur .................. | H04L 12/4625 340/3.1 |
| 7,447,574 | B1 * | 11/2008 | Washicko ........... | B60R 16/0207 701/33.4 |
| 7,596,437 | B1 * | 9/2009 | Hunt ................... | B60R 16/0207 701/33.2 |
| 7,599,769 | B2 * | 10/2009 | Nou ............................... | 701/32 |
| 7,643,912 | B2 * | 1/2010 | Heffington ............. | G07C 5/085 340/425.5 |
| 7,672,763 | B1 * | 3/2010 | Hunt ................... | B60R 16/0207 701/33.2 |
| 7,690,950 | B2 * | 4/2010 | Owen, Sr. ........... | B60R 16/0207 439/336 |
| 7,705,602 | B2 * | 4/2010 | Bertness .............. | G01R 31/007 320/104 |
| 7,724,517 | B2 * | 5/2010 | Attlesey et al. .......... | 361/679.53 |
| 7,818,098 | B2 * | 10/2010 | Koepf ..................... | G06F 11/25 701/1 |
| 7,904,219 | B1 * | 3/2011 | Lowrey ................. | G01C 21/26 701/32.3 |
| 2002/0016655 | A1 * | 2/2002 | Joao .................................. | 701/35 |
| 2008/0268662 | A1 * | 10/2008 | Krivtsov ............... | H01R 27/02 439/34 |

* cited by examiner

*Primary Examiner* — Thomas G Black
*Assistant Examiner* — Wae Louie
(74) *Attorney, Agent, or Firm* — Carlson, Gaskey & Olds, P.C.

(57) ABSTRACT

An exemplary pass-through connector includes a connector housing a first end and a second end. A first amount of terminals extends from said first end to said second end. A supply line connects to a second amount of terminals. The supply line is located apart from the first end and the second end. The second amount of terminals is less than said first amount of terminals.

25 Claims, 3 Drawing Sheets

PASS-THROUGH CONNECTOR

BACKGROUND OF THE INVENTION

This application relates to power sources. More specifically, this invention relates to providing a power source utilizing existing vehicular hardware without inhibiting the functionality of the vehicular hardware.

Vehicles include various features to aid with diagnosis for repair, testing, and evaluation. Standardizing features reduces the assortment of tools needed to perform a vehicle diagnostic test across multiple vehicle lines. One such standardized feature is the onboard diagnostic (OBD) port. A technician or vehicle operator can engage the port with a diagnostic device to obtain a variety of information about the vehicle. Standardizing the architecture of the port across various vehicle platforms enables a technician or vehicle operator to use similar diagnostic devices to evaluate multiple vehicles. Although standardized, various versions of the OBD port exist, each version representing a developmental iteration of the OBD standard port. The OBD-II port is one such iteration.

The OBD-II port includes multiple pins. At least one pin provides power from the vehicle, and at least one pin provides a ground from the vehicle. When not directly connected to a diagnostic device, such as when the vehicle is moving, the OBD-II port typically remains disconnected under the hood of the vehicle. Another common installation location for the OBD-II diagnostic port is in the vehicle cabin. Vehicular packaging constraints under the hood and in the vehicle cabin limit the size and geometry of OBD-II connectors capable of engaging the OBD-II port.

When engaged, the OBD-II connector may interfere with the driver or the front seat passenger. Reducing the size of the OBD-II connector may reduce the interference, but may limit the OBD-II connector functions.

In addition to increasingly demanding diagnostic capabilities, today's consumers and technicians increasingly rely on vehicles as a source of power for aftermarket devices. The IPAID device manufactured by Intelligent Mechatronic Systems Inc. of Waterloo, Canada is one such aftermarket device requiring power. Further, to meet consumer demands, vehicle original equipment manufactures may augment existing vehicles with added power-requiring content, such as dealer installed equipment. Further, vehicle packaging constraints also limit incorporating power points and outlets within existing vehicle architectures.

SUMMARY OF THE INVENTION

An exemplary pass-through connector includes a connector housing a first end and a second end. A plurality of terminals extends from said first end to said second end. A supply line connects to a subset of the plurality of terminals. The supply line is located apart from the first end and the second end.

The supply line connects to the subset of the plurality of terminals through a supply line link. The position of the supply line and the supply line link relative to the connector orientation is reversible, and may be repositioned depending on the car architecture. The supply line may be protected from overcurrent with a polyswitch resettable device.

An exemplary method of providing power from a vehicle includes engaging a diagnostic port of a vehicle with a connector and providing a port within the connector for engaging a diagnostic device. Also, directing power from the connector through a supply line apart from the port and providing greater diagnostic capability from the port than from the supply line.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
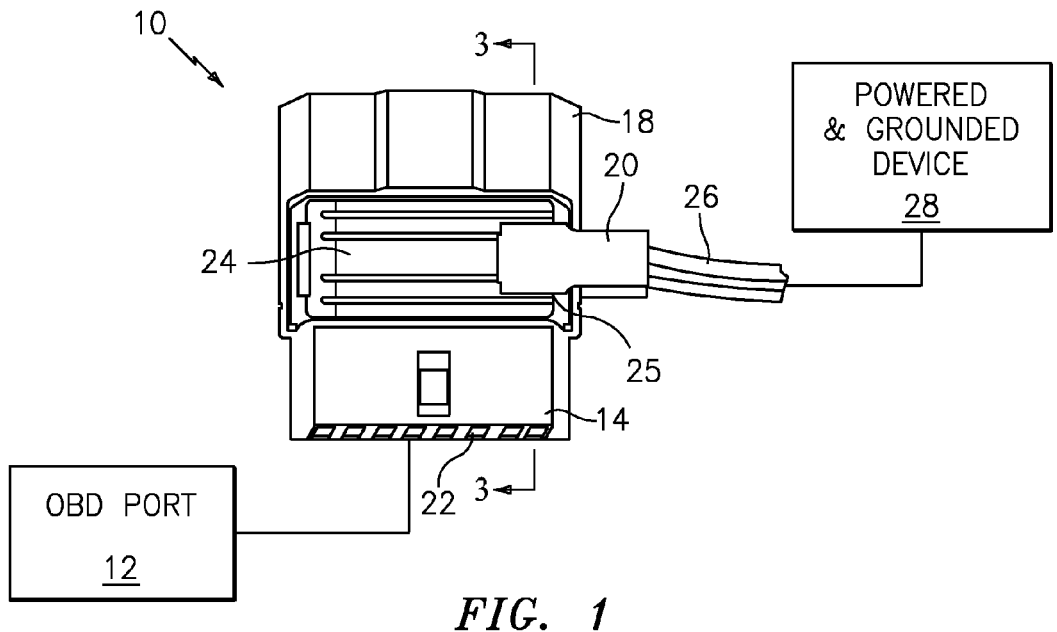
FIG. 1 is a plan view of an example pass-through connector.

FIG. 1 illustrates an example pass-through connector 10 for use with an onboard diagnostic (OBD) system, more specifically an OBD-II system. A first end 14 of the connector 10 is sized to directly connect the connector 10 to an OBD-II port 12 within a vehicle. The second end 18 of the connector 10 is sized to engage diagnostic equipment, such as diagnostic equipment used by a technician at a repair garage, which may alternatively connect directly to the OBD-II port 12. The second end 18 thus provides complimentary connection to the first end 14.

The connector 10 communicates information about the vehicle to the diagnostic equipment through various terminals 22 within the connector 10. At least some of the terminals 22 communicate power and ground from the vehicle. In this example, a supply line 26 communicates power and ground away from the connector 10 to a powered and grounded device 28. A supply line link 20 connects the supply line 26 to the connector 10. A cover 24 engages the connector 10 adjacent the supply line link 20, and includes an aperture 25 for receiving the first supply line link 20.

Figure 2:
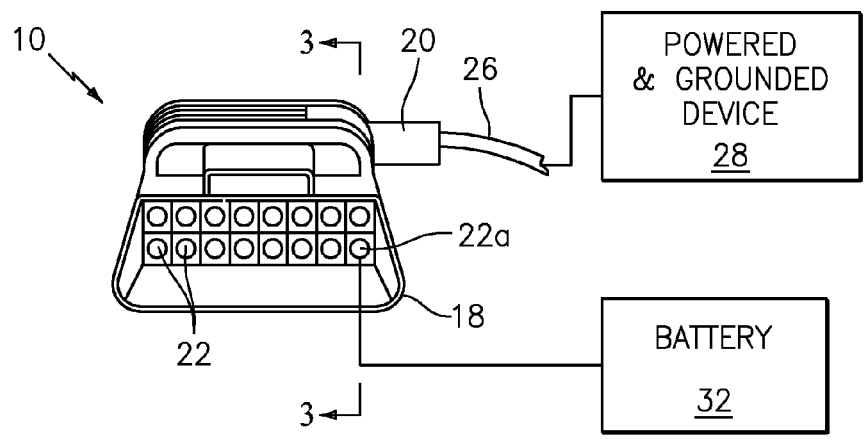
FIG. 2 is an end view of the example pass-through connector of FIG. 1.

The example connector 10 includes sixteen terminals 22, as shown in the side view of FIG. 2. One of the terminals 22, is a power terminal 22a, which communicates power from the vehicle. That is, when the connector 10 engages the OBD-II port within the vehicle, the power terminal 22a communicates directly with a vehicular power source, such as a vehicle battery 32. In other examples, terminal 22a could be a ground terminal or a data terminal. This example illustrates the supply line link 20 is a reverse orientation from the supply link shown in FIG. 1.

A device adapted to utilize power may directly connect to a power terminal 22a at the second end 18; however, doing so would interfere with connecting diagnostic equipment to the connector 10. The supply line 26 routes power from the connector 10 without interfering with the connectivity to the pass-through connector 10, which is in direct communication with the OBD-II port of the vehicle. Thus, diagnostic equipment may be connected and disconnected to the second end 18 without interrupting power routed via the supply line 26.

Example devices designed to utilize power from the OBD-II port include the IPAID system designed and marketed by Intelligent Mechatronic Systems Inc. of Waterloo, Canada.

Figure 3:
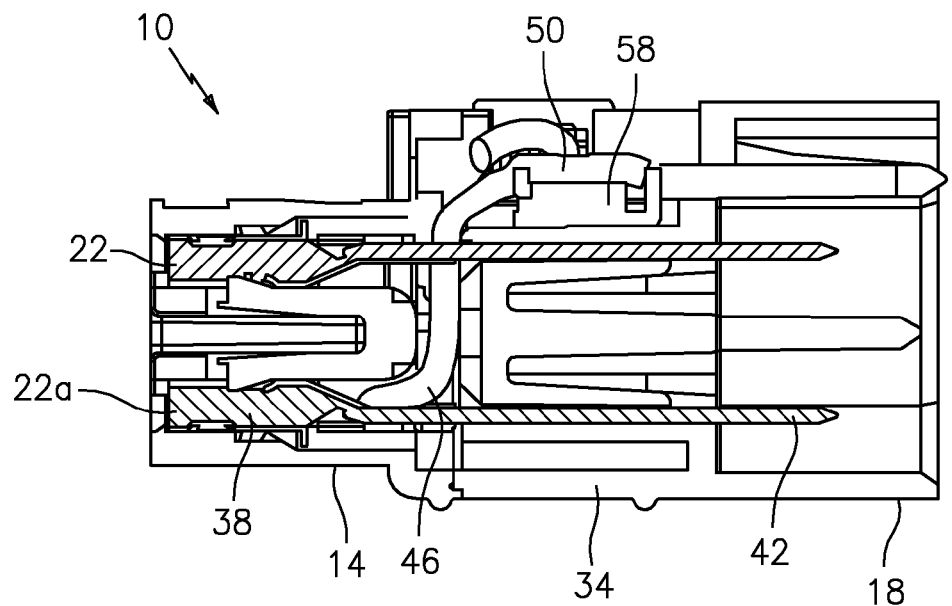
FIG. 3 is a cross-sectional view through the example pass-through connector of FIGS. 1 and 2 taken along line 3-3 of FIG. 1 (or 2)

Referring now to FIG. 3, a housing 34 defines the general profile of the connector 10 and partially surrounds the terminal 22, which is adapted to communicate diagnostic information, power, or ground, from the first end 14 of the connector 10 to the second end 18. The terminal 22 includes a female terminal end 38 and a male terminal end 42. In this example, a power terminal 22a, a type of terminal 22, communicates power from the first end 14 to the second end 18. A wire 46 connects directly to the power terminal 22a and communicates power from the terminal 22 to the supply line 26 through the supply line link 20 (FIG. 2). Male terminal end 42 also maintains power. An overcurrent protection portion, such as a fuse device 58, prevents power overloads from communicating away from the connector 10. In one example, the fuse device 58 is a resetable polyswitch fuse device. In a similar manner second wire 50 connects directly to a ground terminal (not shown) within the connector 10 and routes ground to the supply line 26. In this example, the supply line 26 includes power and ground from the connector 10.

Although generally described in terms of communicating power and ground away from the connector 10, those skilled in the art and having the benefit of this disclosure may recognize that information about the vehicle, such as diagnostic information, could similarly be communicated away from the connector 10 via the supply line 26. For example, in addition to wires 46 and 50 respectively communicating power and ground from the connector 10, a third wire may communicate emissions information from a terminal 22 within the connector 10. Including a connection to this terminal 22 within the supply line 26 (FIG. 2) enables devices to receive emissions data without substantially interfering with the connection to the second end 18 of the connector 10.

Individually selecting the contents of the supply line 26 allows the supply line and associated connections to the terminal 22 within the connector 10 to be tailored for connecting to a specific device. As a result, superfluous connections can be eliminated, which reduces the size of the supply line 26, and the size of the connector 10 needed to accommodate the associated connections of the supply line 26 to the terminal 22. Thus, the connector 10 may be accommodated in environments with limited packaging space. Further, as the supply line 26 communicates with the OBD-II port 12 (FIG. 1) of the vehicle, devices connected to the supply line 26 maintain an uninterrupted connection to the vehicle. As a result, provided the OBD-II port 12 maintains power, the supply line 26 maintains power.

An uninterrupted source of power and ground is especially useful with devices designed to monitor vehicular habits. That is, those devices requiring power sources when the vehicle is not running. Further, as the connector 10 incorporates features designed to reduce packaging requirements, the connector 10 is especially suited to provide power to devices having packaging constraints.

In another example, the connector 10 provides power to devices installed within confined areas of the vehicle, such as in the vehicle trunk and vehicle glove compartment.

The IPAID device may incorporate the connector 10 as a primary connection for power. For example, the supply line 26 may directly communicate power from the OBD-II port 12 through the connector 10 to the IPAID device. The IPAID device may include a removable memory device for extracting information about the vehicle, such as driving habits, etc. The uninterrupted power source from the connector 10 allows the IPAID device to perform operations, such as calculations, when the vehicle is not running. The packaging requirements for the connector 10 enable an operator to position the IPAID device under the hood of the vehicle in a position accessible to the driver, but without substantially obstructing the driver.

In some examples, the IPAID device cannot be installed under the hood. Environmental constraints may limit the installation locations of the IPAID device in this manner. In such an example, the IPAID device is typically installed in the trunk or the vehicle cabin. The supply line 26 provides enough length to install the IPAID, or another aftermarket powered device, in several areas of the vehicle other than underneath the hood.

Figure 4:
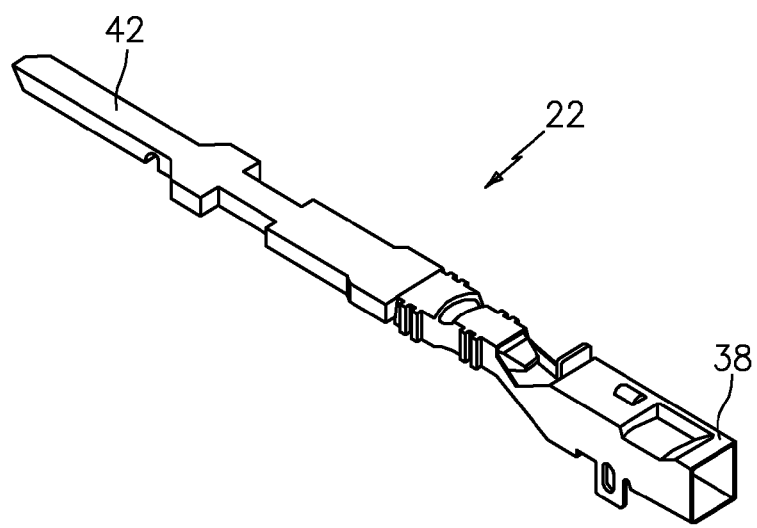
FIG. 4 is a plan view of an example diagnostic terminal.

The example connector 10 includes other improvements for reducing its overall packaging requirements. For example, in the terminal 22 of FIG. 4, the female end 38 and the male end 42 are directly connected, that is, the female end 38 and the male end 42 are crimped and soldered together. Joining the male end 42 and the female end 38 in this manner eliminates the need for wires to communicate power and diagnostic information from the female end 38 to the male end 42. Instead, power and diagnostic information from the OBD-II port on the vehicle moves into the female end 38, through to the male end 42. As a result, the packaging requirements of the diagnostic terminal 22 are diminished as decreasing the length of the diagnostic terminal 22 enables the overall length of the connector 10 to be similarly shortened.

Figure 5:
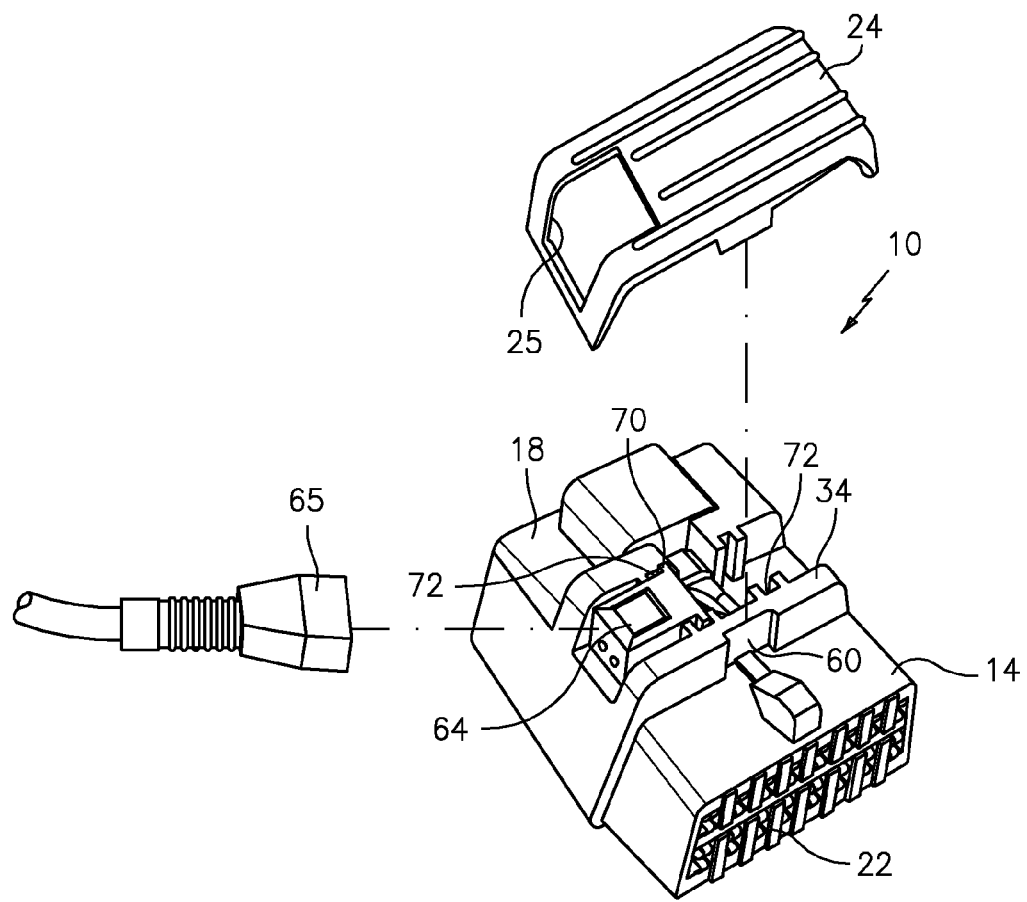
FIG. 5 illustrates a removeable cap of the pass-through connector of FIG. 1 with a reversible cap in a disengaged position.

Referring now to FIG. 5, the top cover 24 may be removed to facilitate moving the supply line link 20 between opposing sides of the example connector 10. The top cover 24 and an engagement portion 60 of the connector 10 include engagement features to hold the top cover 24 relative to the remaining portions of the connector 10. The engagement features hold the top cover 24 in multiple positions permitting the supply line link 20 to engage the connector 10 from opposing sides through the aperture 25 in the top cover 24. A person skilled in the art and having the benefit of this disclosure would be able to develop suitable engagement features for holding the top cover 24.

Figure 6:
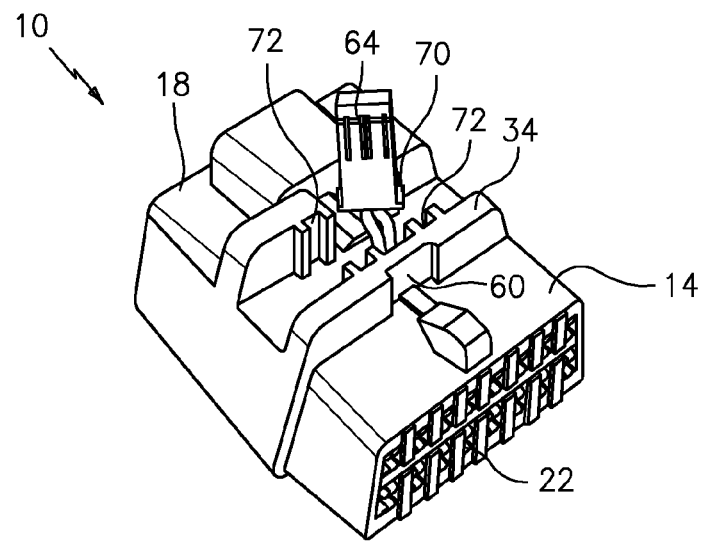
FIG. 6 illustrates a supply line connector moving to a reversed position in the pass-through connector of FIG. 1.

In this example, removing the top cover 24 permits moving the male connector portion 64 between opposing sides of the connector 10, as shown in FIG. 6. Ribs 70 extend from the male connector portion 64 and engage slots 72 within the housing 34. Moving the male connector portion 64 to the opposing side of the connector 10 includes removing the ribs 70 from the slots 72 on one side of the connector 10, and engaging the ribs 70 with the slots 72 on the opposing side. Securing the top cover 24 after moving the male connector portion 64 may further hold the male connector portion 64 in position. After securing the top cover 24, the remaining portions of the supply line link 20 engage the male connector portion 64.

Although illustrated as having the male connector portion 64 of the supply line link 20 (FIG. 1) extending from the connector 10 to engage the female connector portion 65, other examples may include a reversed arrangement having the female connector portion 65 extending from the connector 10.

Although a preferred embodiment has been disclosed, variations and modifications to the disclosed examples may become apparent to those skilled in the art that do not necessarily depart from the essence of this invention. The scope of legal protection given to this invention can only be determined by studying the following claims.

We claim:

1. A pass-through connector, comprising:
 a connector housing having a first end and an opposing, second end;
 a plurality of terminals each extending from said first end to said second end; and
 a supply line operative to communicate with a subset of said plurality of terminals, said supply line located apart from said first end and said second end, wherein said supply line is configured to communicate power away from the pass-through connector.

2. The pass-through connector of claim 1, wherein said subset of said plurality of terminals is operative to communicate power from the pass-through connector, the power supplied by a vehicle.

3. The pass-through connector of claim 1, wherein said supply line communicates power from the pass-through connector when said first end is engaged with an on-board diagnostic port of said vehicle.

4. The pass-through connector of claim 1, wherein said first end is connectable to a vehicle onboard diagnostic port that is configured to connect to a diagnostic device, and said second end is configured to connect to the diagnostic device.

5. The pass-through connector of claim 1, wherein said supply line includes an overcurrent protection portion.

6. The pass-through connector of claim 5, wherein said overcurrent protection portion is a polyswitch resettable device.

7. The pass-through connector of claim 5, wherein at least a portion of said polyswitch resettable device is disposed within said connector housing.

8. The pass-through connector of claim 1, wherein said supply line is configured to communicate power to a vehicle monitoring device when said pass-through connector is connected to a diagnostic device and when said pass-through connector is not connected to the diagnostic device.

9. The pass-though connector of claim 1, wherein at least one of said subset of said plurality of terminals has a male portion and a female portion, said male portion partially disposed in either of said first end or said second end, said female portion partially disposed in other of said first end or said second end.

10. The pass-through connector of claim 9, wherein said male portion directly connects to said female portion.

11. The pass-through connector of claim 10, wherein solder joins said male portion and said female portion.

12. The pass-through connector of claim 1, wherein said supply line includes a supply line link.

13. The pass-through connector of claim 12, wherein at least a portion of said supply line link is disposed within said connector housing.

14. A pass-through connector, comprising:
 a connector housing having a first end and a second end, said first end connectable to a vehicle and said second end connectable to a diagnostic device;
 a plurality of terminals extending from said first end to said second end; and
 a supply line located apart from said first end and said second end and operative to communicate with a subset of the plurality of terminals.

15. The pass-through connector of claim 14, wherein said supply line is operative to communicate power from said vehicle to another device.

16. The pass-through connector of claim 14, wherein said supply line is operative to communicate diagnostic information from said vehicle to another device.

17. The pass-through connector of claim 14, wherein said first end is connectable to a vehicle onboard diagnostic port that is configured to connect to a diagnostic device, and said second end is configured to connect to the diagnostic device.

18. The pass-through connector of claim 14, wherein said second end provides a connection complementary to said first end.

19. The pass-through connector of claim 14, including a removable cover portion for engaging said housing in a first position.

20. The pass-through connector of claim 19, wherein said supply line communicates with said subset of the plurality of terminals through said removable cover portion.

21. The pass-through connector of claim 20, wherein said removable cover portion is configured to engage said housing in a second position opposite said first position.

22. A method of providing power from a vehicle, comprising:
 engaging a first port of a vehicle with a pass-through connector;
 providing a second port within the pass-through connector, the second port configured to engage a diagnostic device connector;
 directing power from said pass-through connector through a supply line apart from the first port and the second port; and
 providing greater diagnostic capability from the second port than from the supply line.

23. The method of claim 22, wherein the first port is an onboard diagnostic port.

24. The method of claim 22, including providing diagnostic capability through the supply line.

25. The method of claim 22, wherein the diagnostic device connector is configured to engage the first port when the pass-through connector is not engaged with the first port.

* * * * *